Sept. 29, 1936.  J. W. KUHN  2,056,106
PNEUMATIC SPRING
Filed July 24, 1935   3 Sheets-Sheet 1

Inventor
John W. Kuhn
By Eccleston & Eccleston
Attorneys

Sept. 29, 1936.　　　J. W. KUHN　　　2,056,106
PNEUMATIC SPRING
Filed July 24, 1935　　　3 Sheets-Sheet 2
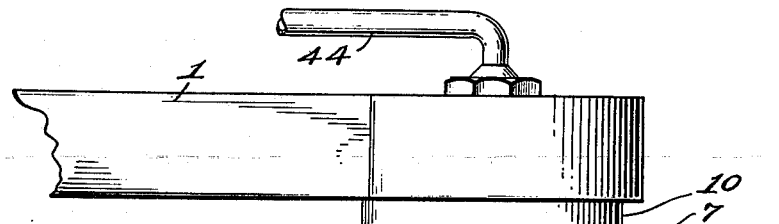
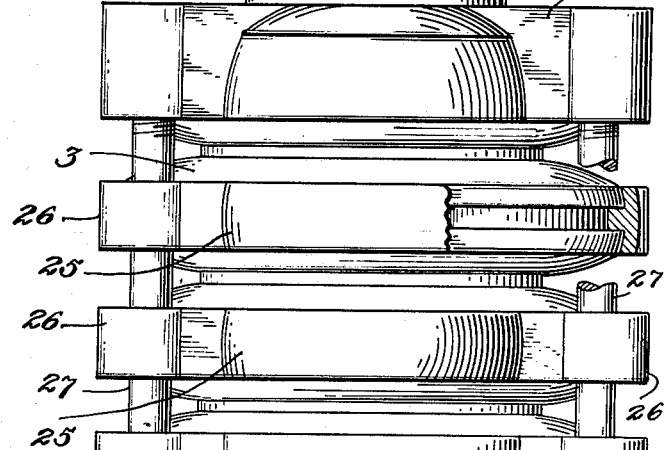
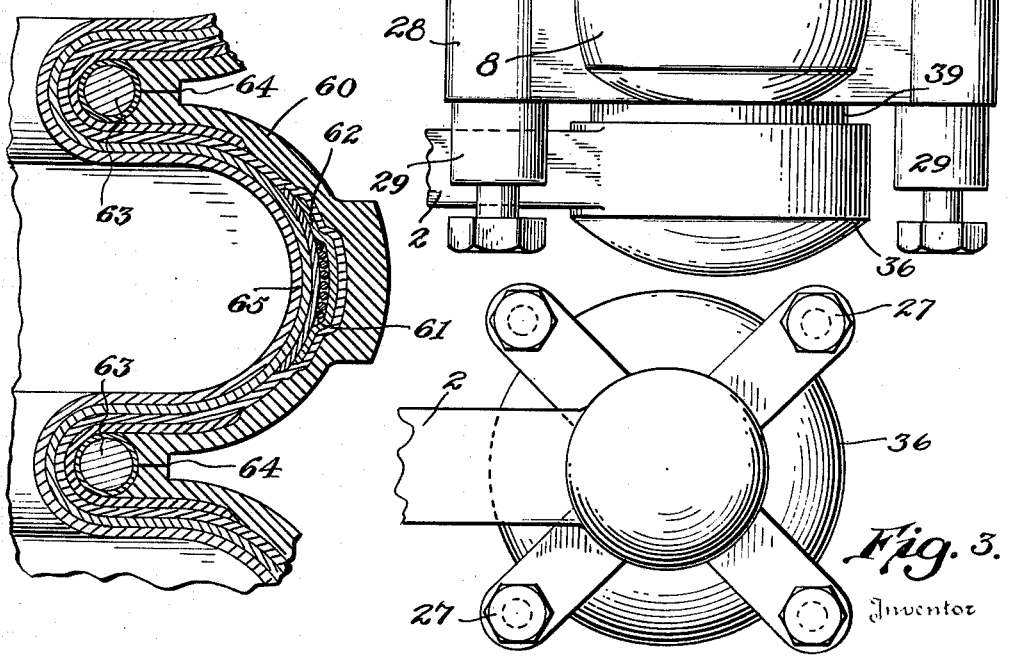
Inventor
John W. Kuhn
By Eccleston & Eccleston,
Attorneys Sept. 29, 1936.　　　　J. W. KUHN　　　　2,056,106
PNEUMATIC SPRING
Filed July 24, 1935　　　3 Sheets-Sheet 3

Inventor
John W. Kuhn

By Eccleston & Eccleston,
Attorneys

Patented Sept. 29, 1936

2,056,106

UNITED STATES PATENT OFFICE 2,056,106

PNEUMATIC SPRING

John W. Kuhn, Akron, Ohio

Application July 24, 1935, Serial No. 32,954

14 Claims. (Cl. 267—35)

This invention relates to spring devices for automobiles and similar vehicles and has for its primary object the provision of a practical construction of compressed air spring which may be substituted for and take the place of the ordinary metal leaf springs now in common use.

A further object of the invention resides in the provision of a compressed air spring which is so designed as to possess high shock-absorbing qualities, and which can be easily adjusted to suit varying loads.

Another object of the invention consists in combining in a compact and efficient manner a compressed air spring and a shock absorber or control element of the compressed air type.

Other objects and advantages of the invention will be apparent from the following description when taken in connection with the accompanying drawings, in which, Figure 1 is a vertical sectional view through one form of spring and a control element combined therewith.

Figure 2 is a side elevational view of the construction of Figure 1.

Figure 3 is a bottom plan view of the invention shown in Figures 1 and 2.

Figure 4 is a fragmentary sectional view of a modified construction of spring, and, Figure 5 is a side elevational view, partly broken away, of a further modified construction.

Figure 1:
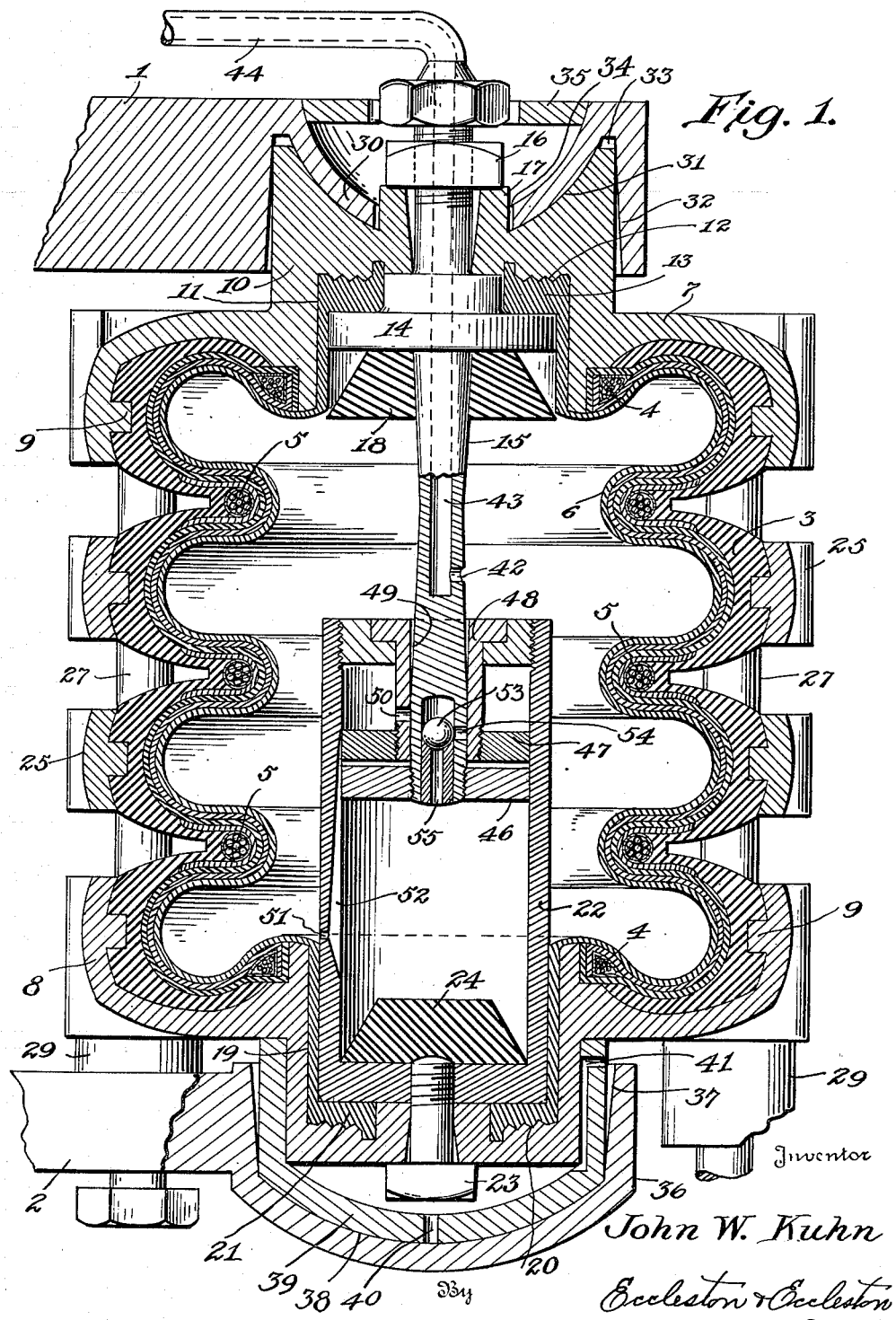

Referring to the drawings in detail, the numeral 1 indicates the chassis or equivalent part of an automobile, while the numeral 2 indicates a support on the axle or other part of the running gear, and it is between these elements that the springs are supported. The particular manner of mounting the springs will be disclosed in an application to be filed later.

The spring proper comprises a casing 3 built up in very much the manner of an automobile tire, but formed of a series of annular rib-like sections. Four of these sections are indicated in Figures 1 and 2 but it will be apparent that this number may be increased or diminished in accordance with circumstances.

The casing 3 is built up on a steel mandrel having the desired configuration and consists of a plurality of layers of rubberized cord and rubberized fabric, an outer layer of rubber, and the usual chaffing strips. Beads reinforced by rubberized wires are also provided and are indicated by the numerals 4 and 5. The numeral 4 indicates the outer beads and the numeral 5 the inner beads. Within the casing 3 is an open-ended air bag 6 having its opposite ends sealed in a manner hereinafter described.

In order to properly mount the casing 3, rims or base members 7 and 8 are provided. These members are formed with inwardly directed flanges 9 adapted to seat in grooves formed in the outer walls of the top and bottom sections of the casing and extend over the ends of the casing to grip the outer beads 4. The upper rim 7 is provided with an enlargement 10, having a cavity 11 on its inner side for the reception of one end of the gas bag 6. The base of the cavity is provided with a plurality of annular grooves 12 preferably coated with cement, and the thickened rim 13 of the gas bag is compressed into sealing relation with the grooves by a plate 14 fixed to or forming a part of a piston rod 15. The plate or washer 14 is drawn to clamping position by means of a nut 16 threaded on the upper end of the piston rod and engaging a boss 17 on the enlargement 10. The opening through the boss 17 is preferably tapered so as to permit of a more efficient sealing of the bag.

Mounted on the under-side of plate 14 is a rubber block 18 for a purpose which will later appear.

The lower rim or base member 8 is also provided with an enlargement having a cavity 19 for the reception of the lower end of the gas bag 6, and the base of this cavity is also provided with a series of annular grooves 20 for receiving the thickened end 21 of the gas bag. These grooves are preferably coated with cement as are grooves 12. The clamping or gripping action in this case is provided by the base of a cylinder 22 which is drawn to clamping position by a screw-bolt 23 extending through a tapered opening in the plate 8. Within the cylinder 22 is a rubber block 24 which is complementary to block 18 as will be referred to later.

The intermediate annular sections of the casing are shown as provided with annular steel rings or bands 25 and these bands are shown as provided with eyes 26 for the reception of bolts or guide rods 27. These bolts 27 pass through eyes 28 formed on base plate 8 as well as through eyes 26 on rings 25 and are screwed into the upper plate or rim 7. The heads of bolts 27 are spaced from the plate 8 and are provided with rubber blocks 29 to produce a cushioning effect during the operation of the springs.

The purpose of the rings 25 is to prevent buckling when long springs of small diameter are used; also the rings resist excessive air pressure in the casing. It is to be understood however that the rings 25 are not essential to the operation of the springs and may be dispensed with where desired.

In mounting the springs on a vehicle it is apparent that a definite but limited movement between the spring and support is necessary. To this end a substantially ball and socket joint is provided comprising the ball member 30 formed on the support 1 and the concaved or socket portion 31 formed on the enlargement 10 of base plate 7. The wall 32 surrounding the ball member 30 is slightly tapered as shown and the member 31 stops short of the base of the ball member, thereby providing an annular space 33 and allowing the desired freedom of action between the spring and support 1.

In order to provide the necessary lubrication of the ball and socket joint the ball portion is made hollow to receive a lubricant and the opening 34 through which the boss 17 extends is somewhat larger than the diameter of the boss thereby permitting the lubricant to flow to the surfaces to be lubricated. A cover 35 is preferably applied to the hollow portion of the ball which receives the lubricant.

The lower end of the spring is supported in much the same manner as the upper end so as to provide the desired freedom of movement. The support 2 is formed with a cup 36 having a tapered wall 37 and socket portion 38 which receives the ball member 39 fixed to the enlargement on base plate 8. The ball 39 is provided with an oil hole 40 for the passage of lubricant to the sliding surfaces forming the joint, and a passage 41 is provided for charging the interior of the ball with lubricant.

The air bag 6 is inflated with compressed air which is injected into the interior of the casing through aperture 42 and passage 43 formed in piston rod 15. The upper end of the passage 43 communicates with a conduit 44 leading to a source of compressed air. It will be understood of course that the pressure placed in the casings may be varied in accordance with the load to be carried thus improving the riding qualities of the vehicle.

It is desirable, although not essential, to have some means for controlling or damping the compressions and expansions of the springs and the vehicle body supported thereby, and for this purpose a compressed air cylinder and piston may be employed when desired. In the embodiment of the invention disclosed in Figure 1 I have shown such a cylinder indicated by the numeral 22 and piston 46 secured to the lower end of piston rod 15. A secondary piston 47 is also mounted in the cylinder 22 and is normally spaced from the upper end of the cylinder by a movably-mounted sleeve 48 to which it is attached. It will be noted that the piston rod 15 is tapered as indicated by numeral 49, and an aperture 50 cooperates with this tapered portion to provide communication between the upper end of the cylinder and the interior of the spring under certain conditions.

The lower portion of the cylinder 22 communicates with the interior of the spring casing by means of an aperture 51 and a tapered groove 52 permits a flow of compressed air around piston 46 as the latter approaches the bottom of the cylinder; the rate of flow varying with the position of the piston. Within the piston rod 15 is a ball valve 53 which cooperates with passages 54 and 55 formed in the lower end of the rod.

The operation of this control mechanism when used is as follows:

When a shock is transmitted to the spring the cylinder 22 rises thus separating the pistons 46 and 47 and creating a momentary vacuum between them. As the cylinder continues its upward movement the air pressure in the lower end of the cylinder increases momentarily and the air flows slowly through passages 55 and 54 and slot 52 into the space between the two pistons. The rate of flow of air increases of course as the piston reaches the wider portions of the slot 52.

On the rebound the cylinder starts downward, rapidly at first, but its speed of movement is gradually reduced by a reversal of the procedure just described. The valve 53 automatically closes. A partial vacuum is formed in the lower end of the cylinder and the pressure increases in the upper end of the cylinder. As the cylinder travels downward the tapered slot 52 further reduces the flow of air from the upper to the lower end of the cylinder. If the shock is so great as to necessitate a severe rebound the piston 46 will engage piston 47 forming a momentary cushion of air between the two. In the meantime the compressed air has filled the chamber above piston 47 through aperture 50 and the tapered slot 49, and the aperture 50 has been closed by the cylindrical portion of the piston rod, thereby checking the rebound. By transmitting air through both slot 52 and passage 55 when the cylinder rises and only through slot 52 as the cylinder descends it will be apparent that the rebound is checked to a greater extent than is the initial compression of the spring.

In the event that the casing 3 should become entirely deflated through any reason whatever the rubber blocks 18 and 24 will serve to support the load, the block 18 engaging the top of cylinder 22 and the block 24 engaging the piston 46.

While the control cylinder is shown as mounted on the interior of casing 3 it will be apparent that it could be disposed exteriorly thereof if desired.

In the modified construction shown in Figure 4 the casing 60 is built up to provide an integral series of annular sections as in the form previously described, but in lieu of the steel rings 25 the sections are provided with a different type of reinforcement. This reinforcement comprises a series of insulated wires 61 and two or more plies of rubberized fabric or rubberized cord as indicated by numeral 62. The inner beads of this form of the invention may be reinforced with steel bands 63 instead of the usual wire reinforcements and to provide for mounting these bands the casing is provided with the required number of annular slits 64. The gas bag is identical with that heretofore described and is indicated by numeral 65.

Figure 5:
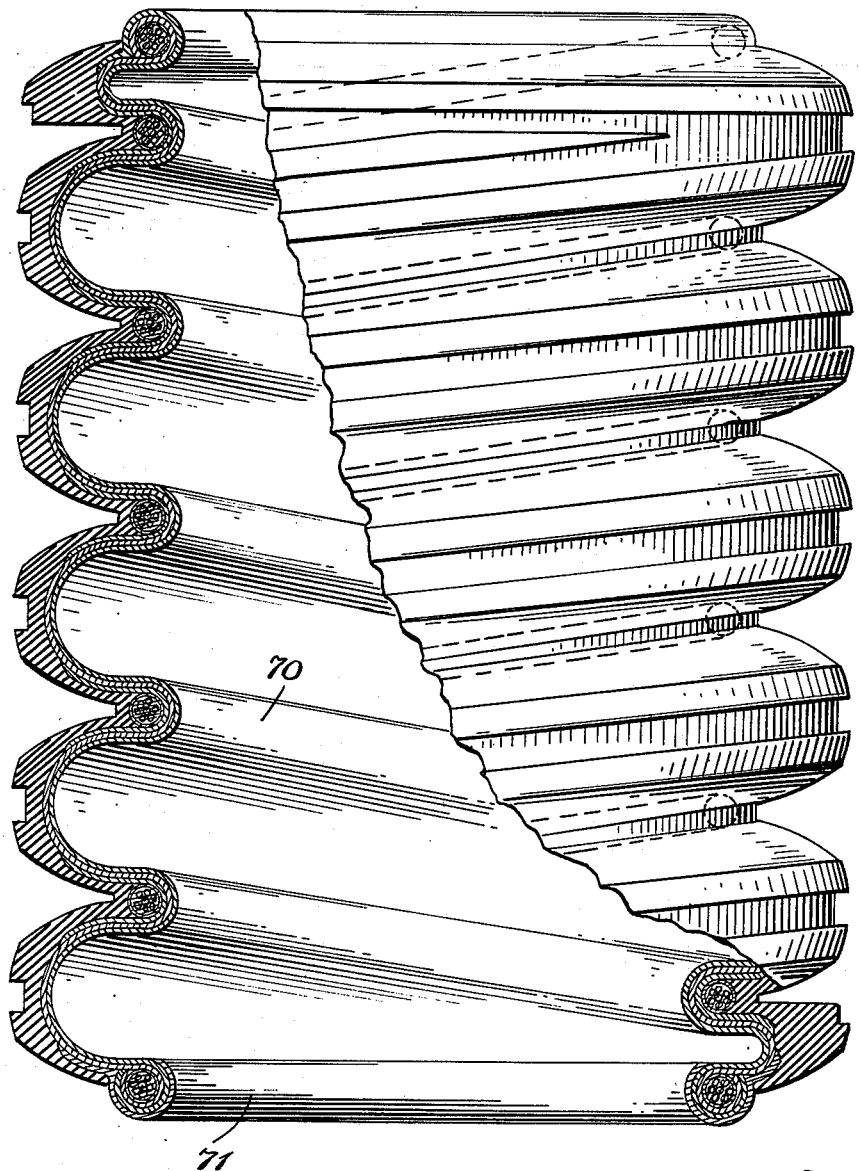

In Figure 5 is shown a modified construction of casing in which the inner bead 70 is arranged in a spiral form as distinguished from the series of parallel beads of Figure 1. The outer beads are indicated by the numeral 71, and the action of the device is substantially identical with that heretofore described.

From the above description and the attached drawings it will be apparent to those skilled in the art that I have devised a novel spring of the compressed air type; that it is of strong and durable construction; that it possesses high shock-absorbing qualities and can be adjusted to varying loads; and that a control element for restricting the compression and expansion of the spring is combined therewith.

In accordance with the patent statutes I have described what I now believe to be the preferred form of the invention but inasmuch as various minor changes may be made in the details of construction without departing from the spirit of the invention it is intended that such changes be included within the scope of the appended claims.

What I claim is:

1. A pneumatic spring device including a built-up casing of tire fabric provided with a plurality of ribs, steel bands provided with vertical apertures encircling said ribs, and guide rods extending through aligned apertures of the respective bands.

2. A pneumatic spring device including a built-up casing of tire fabric provided with a plurality of ribs and beads, upper and lower base members gripping the top and bottom beads, apertured steel bands encircling certain of said ribs, guide rods extending through one of the base members and through aligned openings of said bands and anchored to the other base member.

3. A pneumatic spring device including a built-up casing of tire fabric provided with a plurality of ribs and beads, upper and lower base members gripping the top and bottom beads, apertured steel bands encircling certain of said ribs, headed guide bolts extending through one of said base members with their heads spaced therefrom, said bolts also extending through aligned apertures of the steel bands and anchored to the other base member, and rubber blocks interposed between the heads of said bolts and the adjacent base member.

4. A pneumatic spring device including a built-up casing of tire fabric provided with a plurality of ribs and beads, upper and lower base members gripping the upper and lower beads, upper and lower supports for said spring, and ball and socket connections between said base members and supports.

5. A pneumatic spring device including an inflatable casing, a cylinder and piston in said casing, means for connecting the cylinder and piston to opposite ends of the casing, means permitting the entrance of air to the opposite ends of the cylinder, and means permitting the escape of air from one side of the piston to the other.

6. A pneumatic spring device including an inflatable casing, a cylinder and piston in said casing, means for connecting the cylinder and piston to opposite ends of the casing, means permitting the entrance of air to the opposite ends of the cylinder, means permitting the escape of air from one side of the piston to the other, said means permitting a more rapid upward flow of air than downward.

7. A pneumatic spring device including an inflatable casing, a cylinder, primary and secondary pistons in said casing, means for connecting the cylinder and primary piston to opposite ends of the casing, means permitting the entrance of air to the opposite ends of the cylinder, and means permitting the escape of air from the lower end of the cylinder to the space between the pistons.

8. A pneumatic spring device including a unitary, built-up casing of tire fabric, said fabric being extended inwardly and outwardly at intervals and inclined to provide a spiral bead in said casing, and a spiral reinforcing member mounted in said bead and located exteriorly of the reinforcing threads of the tire fabric.

9. A pneumatic spring device including a spiral reinforcing member and a built-up casing of tire fabric shaped to form a hollow spiral rib and internal bead with the convolutions of the member imbedded in the bead.

10. A pneumatic spring device including a spiral reinforcing member, a built-up casing of tire fabric shaped to form an outwardly-extending hollow rib of spiral shape and an internal spiral bead, the convolutions of the reinforcing member being imbedded in the convolutions of the bead but exteriorly of the reinforcing fabric of the bead.

11. A pneumatic spring device including a unitary, built-up casing of tire fabric formed to provide outwardly extending ribs and an inwardly extending bead, the material between the ribs being provided with a slit in its exterior surface for the insertion of a reinforcing band, and a reinforcing band positioned in said bead.

12. A pneumatic spring device including a unitary, built-up casing of tire fabric formed to provide outwardly extending ribs and an inwardly extending bead, reinforcing threads in said tire fabric, a reinforcing member positioned in the bead and encircling the reinforcing threads of the material located therein.

13. A pneumatic spring device including a unitary, built-up casing of tire fabric formed to provide outwardly extending ribs and an inwardly extending bead, an annular reinforcing member positioned in the bead, the threads of the tire fabric passing around the inner surface of the annular reinforcing member.

14. A pneumatic spring device including a wire reinforcing member of spiral form, having annular base ends, and a built-up casing of tire fabric formed with a spiral bead merging into annular beads at the ends of the casing, said reinforcing member being imbedded in its entirety in the bead of the casing.

JOHN W. KUHN.